June 5, 1928.

E. ROIRANT 1,671,997

MACHINE FOR MANUFACTURING BOTTLES AND
OTHER HOLLOW OBJECTS MADE OF GLASS

Filed July 9, 1926      9 Sheets-Sheet 1

Inventor.
Emile Roirant.
per  /Nwaters
       Attorney.

June 5, 1928.  1,671,997

E. ROIRANT
MACHINE FOR MANUFACTURING BOTTLES AND
OTHER HOLLOW OBJECTS MADE OF GLASS
Filed July 9, 1926  9 Sheets-Sheet 2

Inventor.
Emile Roirant.
per
Attorney.

June 5, 1928.

E. ROIRANT 1,671,997

MACHINE FOR MANUFACTURING BOTTLES AND
OTHER HOLLOW OBJECTS MADE OF GLASS

Filed July 9, 1926    9 Sheets-Sheet 5

Inventor.
Emile Roirant.
per
Attorney

June 5, 1928.  1,671,997

E. ROIRANT
MACHINE FOR MANUFACTURING BOTTLES AND
OTHER HOLLOW OBJECTS MADE OF GLASS
Filed July 9, 1926    9 Sheets-Sheet 6

Inventor.
Emile Roirant.
per
Attorney

June 5, 1928.                                                    1,671,997
E. ROIRANT
MACHINE FOR MANUFACTURING BOTTLES AND
OTHER HOLLOW OBJECTS MADE OF GLASS
Filed July 9, 1926          9 Sheets-Sheet 7

Inventor:
Emile Roirant.
per
Attorney.

Patented June 5, 1928.

1,671,997

UNITED STATES PATENT OFFICE.

EMILE ROIRANT, OF PARIS, FRANCE, ASSIGNOR TO SOCIETE ANONYME D'ETUDES ET DE CONSTRUCTIONS D'APPAREILS MECANIQUES POUR LA VERRERIE, OF PARIS, FRANCE.

MACHINE FOR MANUFACTURING BOTTLES AND OTHER HOLLOW OBJECTS MADE OF GLASS.

Application filed July 9, 1926, Serial No. 121,409, and in France March 19, 1926.

The present invention has for its object a machine for manufacturing bottles and other hollow articles of glass of the type in which the glass is taken by suction, comprising two parison moulds which receive simultaneously a to and fro motion between the exterior and the interior of the furnace and which suck up in this latter the glass in a state of fusion.

The arrangement and the combination of the parts constituting the machine according to the invention permit better quality products and a greater output to be obtained compared with machines already in use.

The better quality of the products is due:

1.—To the particular arrangement of the parison moulds which are submitted:

(a) To a temperature uniform with the material being gathered.

(b) To a suitable cooling of their shells, the exterior and interior faces of which are enveloped by a cooling atmosphere, in a uniform manner, so as to avoid any prejudicial deformation of these moulds.

2.—To the respective arrangement of the parison and finishing moulds enabling the suitable cooling of the parison moulds to be effected.

In order to facilitate the artificial cooling of the parison moulds, which is produced during a stoppage of the machine when these moulds are on the exterior of the furnace, these moulds are arranged side by side parallel to the front of the furnace and the two finishing moulds are placed on one and on the other side of the parison moulds and in the same horizontal plane.

It results from this arrangement that all the part of the machine situated below the parison moulds is freed from parts and mechanism and that the cooling air can flow freely from below upwards, and envelop all the parts of the parison moulds which are thus brought rapidly to a suitable temperature.

In order to permit this special arrangement of the moulds, the machine comprises an arrangement producing the lateral transport of the parison from each parison mould to the corresponding finishing mould.

The shells of these parison moulds are, in addition, mounted in such a manner as to be capable of moving freely in their covers, one of these covers being itself freely hinged. This combination facilitates the perfect contact of the closing planes of the shells of each of the moulds; in this manner the proper closing of these two moulds is assured during the gathering notwithstanding the more or less different dilatations of these moulds during work and the differences of dimensions which they may have originally.

The better output of the machine is due to the division of the work into six principal phases: three kinematic phases of constant length and three stopping phases. These stops correspond to the duration of two phases of glass making and to that reserved for the cooling of the parison mould. The duration of these three latter phases may be modified at will according to the nature of the objects to be manufactured and may thus always be reduced to the minimum time.

Finally, the various parts of the machine are arranged in such manner as to be accessible and thus to facilitate the supervision and keeping in repair.

In order that the invention may be well understood there will be hereinafter described with respect to the annexed drawings and by way of example one form of carrying into effect the machine for manufacturing bottles and other hollow objects made of glass forming the object of this invention.

As shown in the accompanying drawings the machine according to the invention comprises two parison and sucking moulds A receiving, as it will be hereinafter explained, a horizontal to and fro movement and the opening of which takes place in a direction parallel to their movements so that the two joints of these moulds, after the penetration of the moulds into the interior of the furnace B, are in contact with hot gases having the same temperature.

These parison moulds are combined with:

1.—Two finishing moulds C, the axes of which are fixed, arranged at the level of the parison moulds, laterally to these latter, and the opening of which takes place likewise parallel to the movement of the parison moulds.

2.—Two ring moulds D receiving a double movement: the one similar to that of the parison moulds and the second between the parison moulds and the finishing moulds.

In machines at present in use having a parison mould which sucks up the glass in the interior of the furnace, the plane of closing of this mould is turned towards the interior of the furnace; it results from this, after the suction, as the joints are practically never tight, hot gases enter into the interior of the mould, and due to the direction of the plane of closing, the gases sucked in through the joint situated on the side of the interior of the furnace are at a temperature much higher than those of the gases entering through the joint situated in front of the opening of the furnace.

It follows that the mould is submitted, in two diametrically opposed regions, to very different temperatures during the time of suction.

Under these conditions, the glass sucked up is in contact with walls having unequal temperatures, so that the parison obtained is hotter upon one part of its lateral surface. The inconvenience which results from this is, that after the final blowing of the parison, the hotter part dilates more rapidly than the other parts of the object blown and this latter thus has walls of unequal thickness.

On the contrary, by the present invention, the two joints are in a plane perpendicular to the direction of penetration of the moulds and the hot gases in contact with these joints are at the same degree.

In consequence, after the suction, the gases penetrating through the two joints of the mould are at the same temperature so that the mould is heated in its interior in an unequal manner, and the parison is obtained at a temperature much more homogeneous than in machines already known where moulds present their closing plane turned towards the interior of the furnace.

The machine according to the invention is, in addition, characterized by the arrangement of the finishing moulds C designed with a view to receive, in conditions easily carried into effect, the parison at its exit from the parison moulds above specified.

Figure 7:
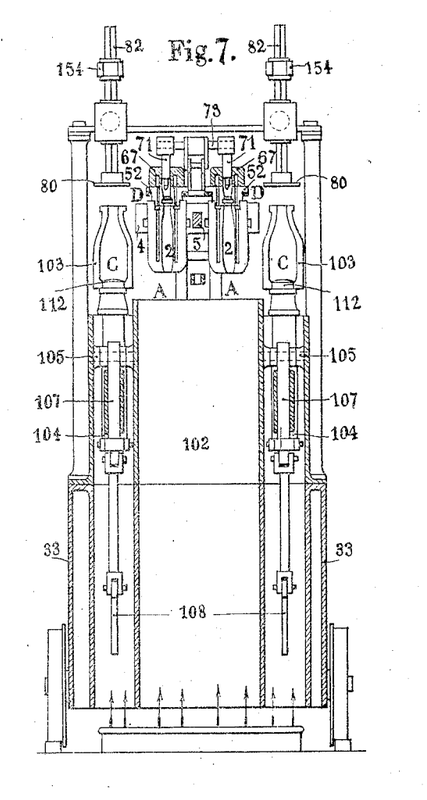
Fig. 7 is a vertical transverse section on the line D—D of Fig. 1.

These finishing moulds C are, as is seen clearly in Fig. 7, situated laterally at the level of the parison moulds A, at the end of the rear travel of these latter, so as to receive the parison after the opening of the parison moulds, with a minimum movement of the said parison.

In addition by this arrangement, the space beneath the parison moulds remains entirely free, which permits of ventilating easily, under the best possible conditions, the said parison moulds, when they are brought to the backward position.

The arrangement of opening of each parison mould permits, in addition, to construct a machine comprising two parison moulds mounted, the one on one side and the other on the other side of a common support and abreast, so that both of them may suck up the glass under the same conditions of temperature.

It is necessary to note that, due to their method of opening, the obstruction of these two moulds is reduced to a minimum, and consequently the opening in the furnace is itself reduced to a minimum.

Figure 11:
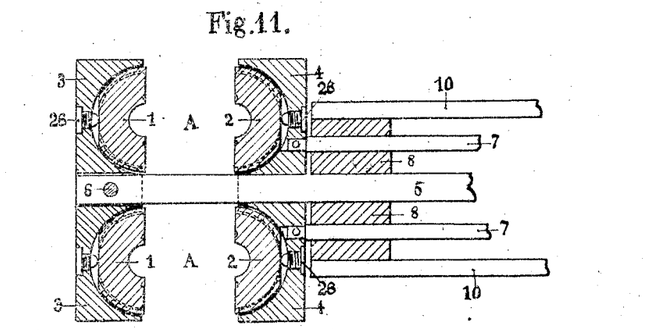
Figs. 11 and 12 are detail views representing the method of mounting the parison moulds.
Figure 12:
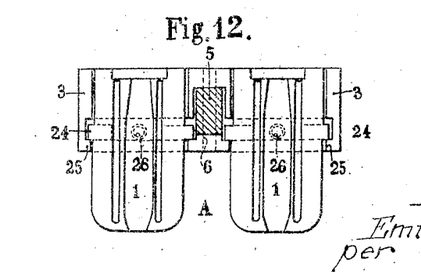

The two parison moulds which are comprised in the machine are consituted each by two opening shells 1 and 2 mounted in a common support, likewise opening in two parts 3 and 4, moving according to the direction of a slide 5 which passes through them at their centre (see Figs. 11 and 12).

One of the parts 3 of this support is fixed to the slide 5 to which it is connected by a pivot 6 around which the said part 3 can slightly oscillate.

The second part 4 is fixed to the end of two slides 7 and rests upon the slide 5, upon which it can move.

Figure 6:
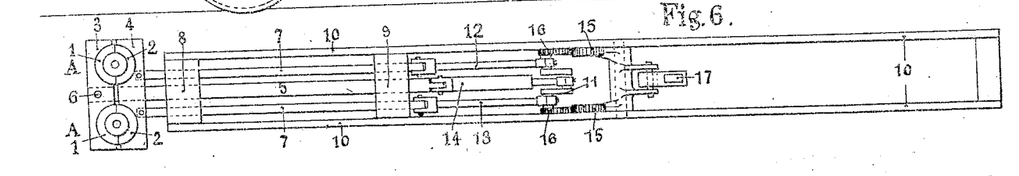

These slides 5 and 7, which are adapted to control the opening and closing of the parison moulds, are carried and guided in supports 8 and 9 of a carriage 10 and receive their movement from a cranked shaft 11 by means of connecting rods 12, 13 and 14 (see Fig. 6).

Figure 3:
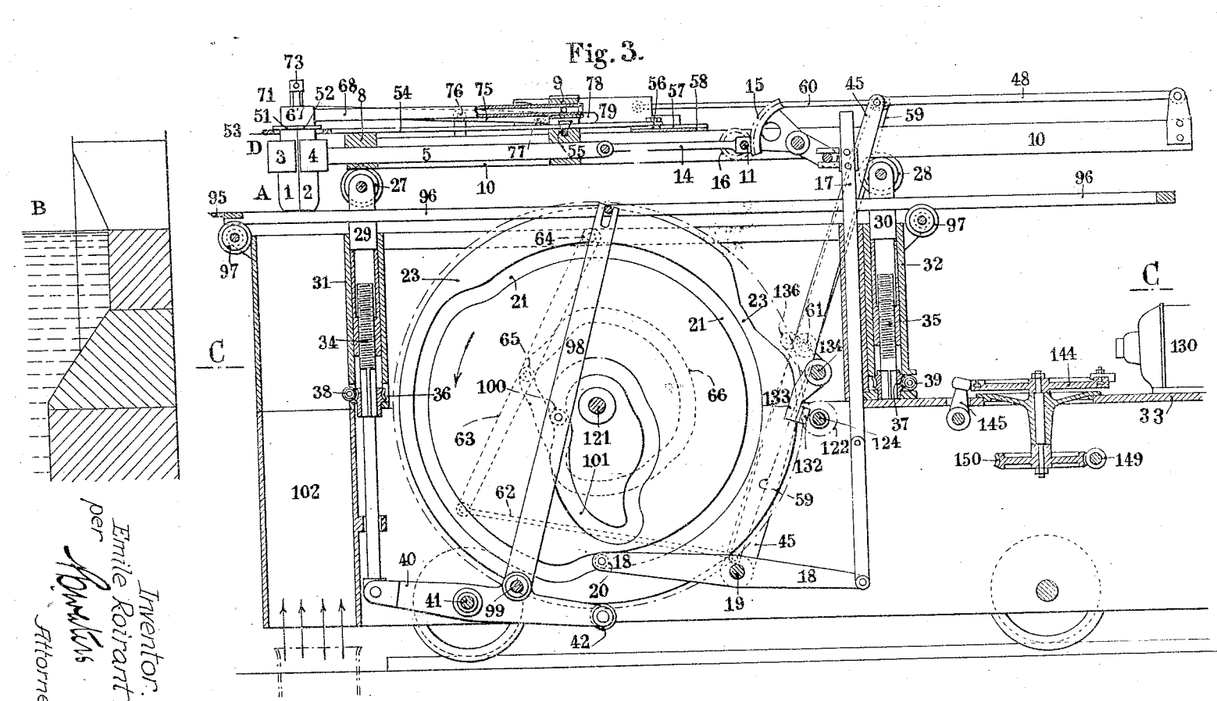
Fig. 3 is a vertical longitudinal section on the line B—B of Fig. 4.

The connecting rods 12 and 13 are attached at one end upon the slides 7 and at the other end upon two similar cranks of the shaft 11, whilst the other connecting rod 14 is attached to the central slide 5 and to a third crank of the shaft 11 fixed at 180° to the two other cranks (see Figs. 3 and 6). By these arrangements it will be understood that, during the rotation of the crank shaft 11, the slide 5 on the one part and the slides 7 on the other part move in opposite directions and that a half revolution of this shaft 11 causes the opening of the parison moulds, whilst the other half revolution causes the closing of same.

These two half revolutions may be accomplished alternately in one and the other direction and are controlled, in the example shown, by a double sector 15 gearing with pinions 16 on the shaft 11 and operated by a vertical slide 17 conveniently guided in the frame of the machine. This slide 17 receives its motion from a lever 18 pivoted at 19 and carrying two rollers 20 which engage respectively in similar grooves 21 formed in the inner faces of the plates 22 and 23 (Fig. 3).

The shells 1 and 2 of each parison mould are provided respectively with a collar 24 simply resting upon a groove 25 formed in each of the supporting pieces 3 and 4, as seen clearly in Fig. 12.

By this arrangement the shells 1 and 2 can move freely in their supports and can thus be applied one against the other after the parts 3 and 4 have come together, and thus ensure the proper closing of these moulds. This result is all the more easily assured as the pressure transmitted by the supports 3 and 4 to the shells is effected at a single point of contact in each shell, in the example represented in Fig. 11 by the screws 26.

Further, if the two shells 1 and 2 of one parison mould come into contact with the two other shells of the other parison mould, these latter will nevertheless by applied one against the other by the fact that the part 3 of the support can oscillate slightly around the axis 6 which connects this part to the central slide 5 (see Fig. 11).

This part 3 of the support thus forms a swinging bar which assures, in combination with the mobility of the shells in their supports, the perfect closing of the two parison moulds, whatever may be the differences of size or of dilatation of these moulds.

This arrangement is very important, above all in the case where the parison moulds take their glass by suction and permits, as will be understood, in as perfect a manner as possible, the tightness of the joint between the shells to be assured.

The parison moulds and the slides 5 and 6 are mounted, as stated above, in a carriage, which, constituted by two twin bars rests at the front and at the back upon two sets of rollers 27 and 28 upon which it can be moved in order to cause the parison moulds to enter the furnace and to be withdrawn to the exterior of this latter.

The rear rollers 28 supporting this carriage are mounted fixedly, but can be regulated in height, whilst the forward rollers 27 are carried by a slide 29 movable vertically and falling, after the penetration of the parison moulds into the furnace, in order to cause these latter to descend until their lower part becomes level with the fused glass.

This method of suspension of the carriage 10 has the advantage of getting rid of much friction and consequently of reducing to the minimum the power required for moving it.

Further, the inclination of the parison moulds caused at the time of the suction of the glass by the lowering of the front rollers 27, may be considered practically as nothing by reason of the great distance between the said moulds and the rear roller 28 upon which the carriage 10 is pivoted.

Preferably, the vertical slide 29 of the front rollers 27 as well as the support 30 of the rear rollers 28 are capable of being regulated in length so as to permit of varying at will, the level of the carriage and, consequently, that of the parison moulds.

In the example shown, this slide 29 as well as the support 30 are constructed, as seen in Fig. 3, in the form of sleeves which, screw threaded internally, slide in guides 31, 32 of the frame 33 and are engaged with the screw threaded rods 34 and 35 carrying the worm wheels 36 and 37 gearing with the endless screws 38 and 39 the rotation of which enables the position of the rollers 27 and 28 to be regulated.

The vertical displacement of the slide 29 of the front rollers is controlled by a lever 40 which, attached to the rod 34, pivots at 41 in the frame of the machine and carries two rollers 42 in contact with two similar cams formed upon the plates 22—23 so that the efforts are transmitted in a vertical direction.

Figure 5:
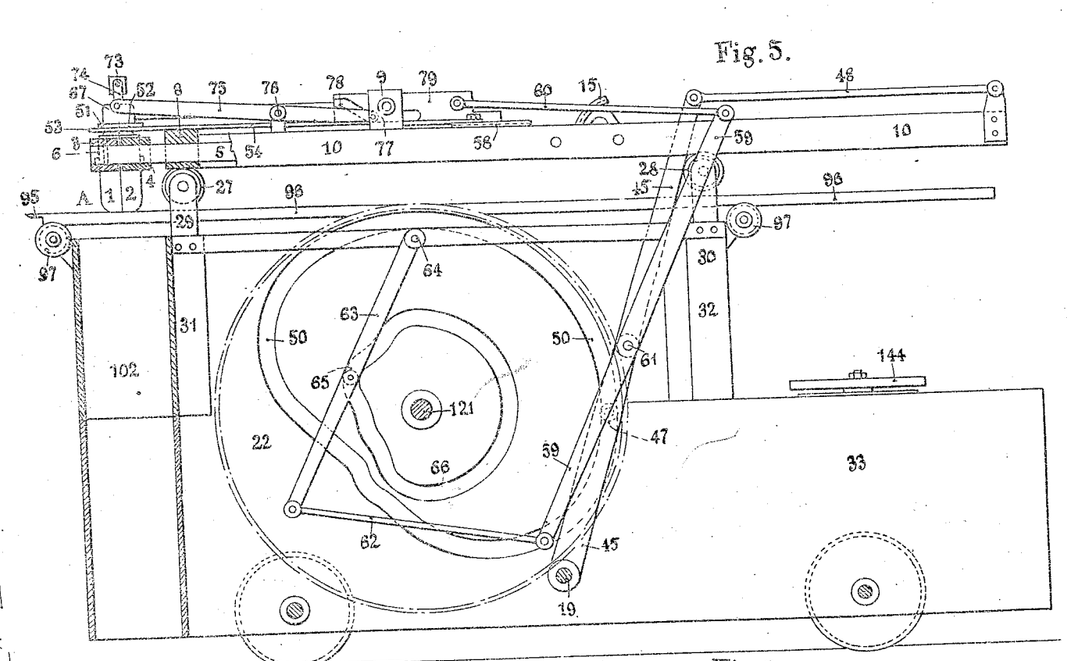
Figs. 5 and 6 show in front elevation and plan the arrangement controlling the movement of the parison moulds.

The control of the movement of the carriage 10 is effected, Fig. 5, by means of two levers 45 which pivoting around the axis 19, each carry a roller 47 and are connected to the carriage 10 by rods 48.

The two rollers 47 are engaged in two similar grooves 50 formed respectively upon the exterior face of the two dies 22 and 23.

Each of the parison moulds is surmounted with a ring mould and a suction head.

These two ring moulds, which are arranged symmetrically with respect to the longitudinal axis of the machine, are each constituted by two shells 51 and 52, resting upon a frame 53 fixed to a lever 54 articulated upon an axis 55 carried by the guide 9 fixed to the carriage 10, so that the ring moulds accompany this carriage 10 and consequently, the parison moulds, during their movements (Figs. 2, 3, 5 and 14).

Figure 2:
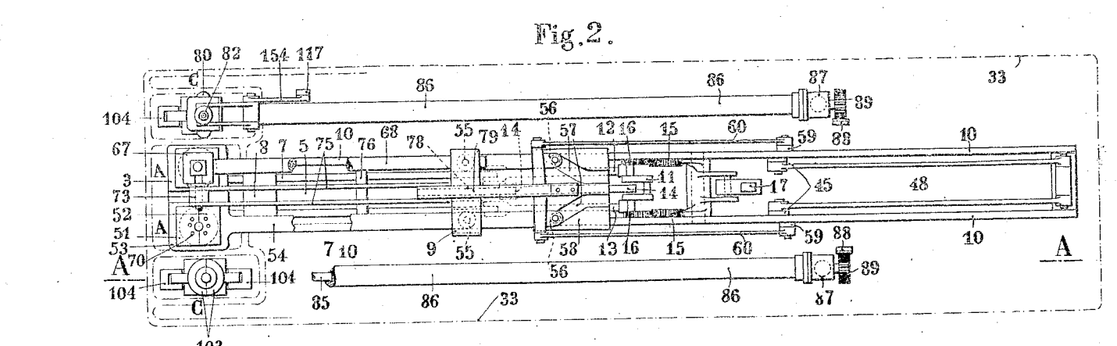
Fig. 2 is a plan view of the upper part of the machine.

Each lever 54 carries, at the opposite end to the frame 53 a roller 56 engaged in a groove 57 formed in a second carriage 58 movable longitudinally on the carriage 10 controlling, as it has been explained the movement of the parison moulds and ring moulds (Figs. 2).

The longitudinal displacement of the carriage 58 is controlled by two levers 59 connected by two rods 60 to the said carriage. These levers receive an oscillating movement around the two axes 61 mounted upon the levers 45, by means of two rods 62 and two levers 63 hinged at 64 in the frame and carrying two rollers 65 engaged in two grooves in the form of a cam 66 of the plates 22 and 23 (see Figs. 2 and 5).

Figure 14:
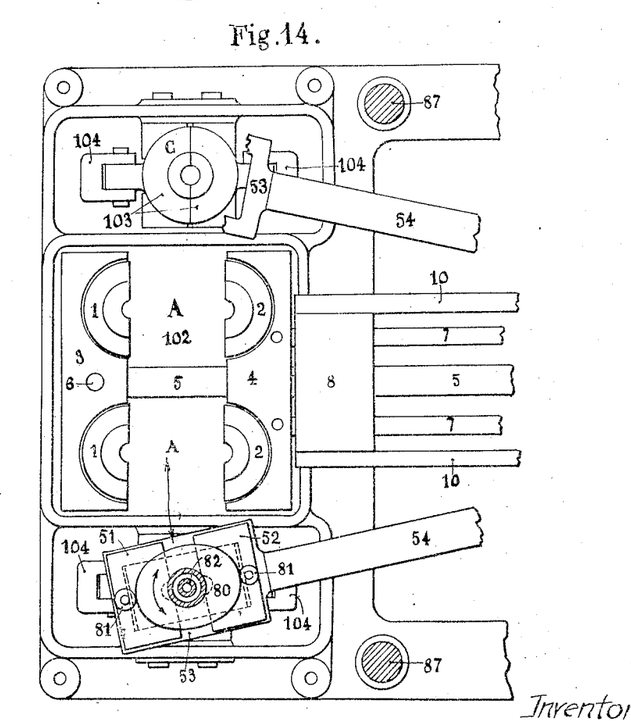
Fig. 14 is a partial plan to an enlarged scale of the whole of the moulds.

The profile of the groove 57 formed in this carriage 58 is determined so that when the carriage is moved in the direction of the parison moulds, the two levers 54 pivot around their axis 55, displacing laterally the two ring moulds which thus move away from the corresponding parison mould as represented in Figs. 2 and 14.

Figure 8:
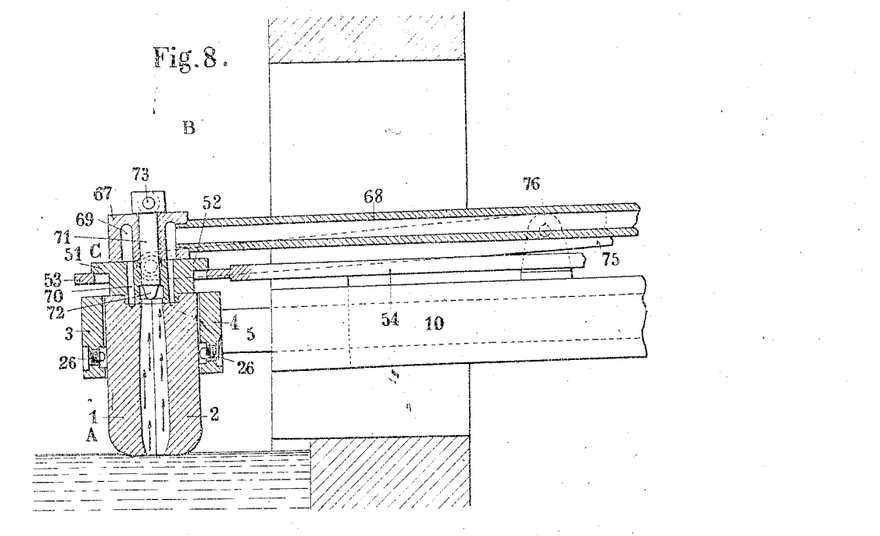
Figs. 8 and 9 represent to a larger scale and as vertical sections the parison mould closed respectively in the interior of the furnace in the position of gathering, and on the exterior of the furnace enclosing the parison.

Each suction head 67 participates in the movement of the parison moulds and of the ring moulds, and is for this object, carried upon the carriage 10 by a tube 68 screwed upon each head and by means of which the depression will be produced in the parison moulds when these latter have penetrated into the furnace (Figs. 3, 5 and 8).

Each tube 68 opens into an annular channel 69 (Figs. 8 and 9) formed in each suction head and communicating with the channels 70 formed in the shells of each ring mould.

In the interior and in the axis of each suction head 67, is a rod 71 capable of moving vertically carrying a boring mandrel 72.

These two mandrels are connected by a cross bar 73 and, by a link 74 to a horizontal lever 75, hinged around an axis 76 carried by the carriage 10, (Figs. 5 and 7).

The other end of this lever 75 carries a roller 77 engaged in a groove 78 of a carriage 79 which is fixed with relation to the carriage 58 and has consequently the same movement as this latter.

Figure 9:
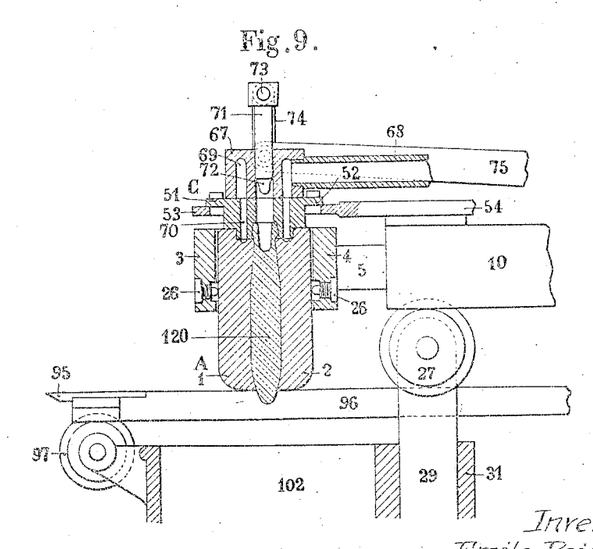

The profile of this groove 78 is determined so as to produce, during the movements of the carriage 79, the vertical movement of the rods 71 carrying the boring mandrels 72 and to cause them to occupy one or other of the positions shown in Figs. 8 and 9.

The two shells 51 and 52 of each ring mould are mounted freely upon their respective frame 53 and the closing of each of these ring moulds is operated by the separation of the shells 1 and 2 of the corresponding parison mould.

The opening of these ring moulds is produced by a cam 80 acting upon two rollers 81 carried by each shell of the ring moulds (Fig. 14).

The alternate movement of rotation of the cams 80 is controlled by the following apparatus:—

Each cam is keyed upon a square shaft 82 (see Fig. 1) passing through a bevel pinion 83 in engagement with another pinion 84 fixed on a shaft 85 located in a support 86 supported by columns 87.

Each shaft 85 is driven by a rack 88, in engagement with a pinion 89 fixed to the said shaft, and operated by a lever 90 oscillating at 19 in the frame and carrying a roller 92, engaged in a groove 93 formed upon the outer face of the disc 94. The same movement is operated for the other cam 80 by a symmetrically arranged groove formed in the outer face of the disc 160.

As soon as the ring moulds are open, they are transported into the axis of each corresponding parison mould by the means above described and are closed, as has been explained by the movement towards each other of the shells 1 and 2 of the parison moulds.

When these parison moulds, surmounted by the ring moulds and suction heads, have sucked up the glass in the furnace, the cutting off of this glass, at the base of the parison moulds, is effected by a cutter comprising two blades 95, which are placed in the same axis as that of the parison moulds at the level of their base, and are fixed upon a bar 96 resting at front and back upon two supporting rollers 97.

Figure 4:
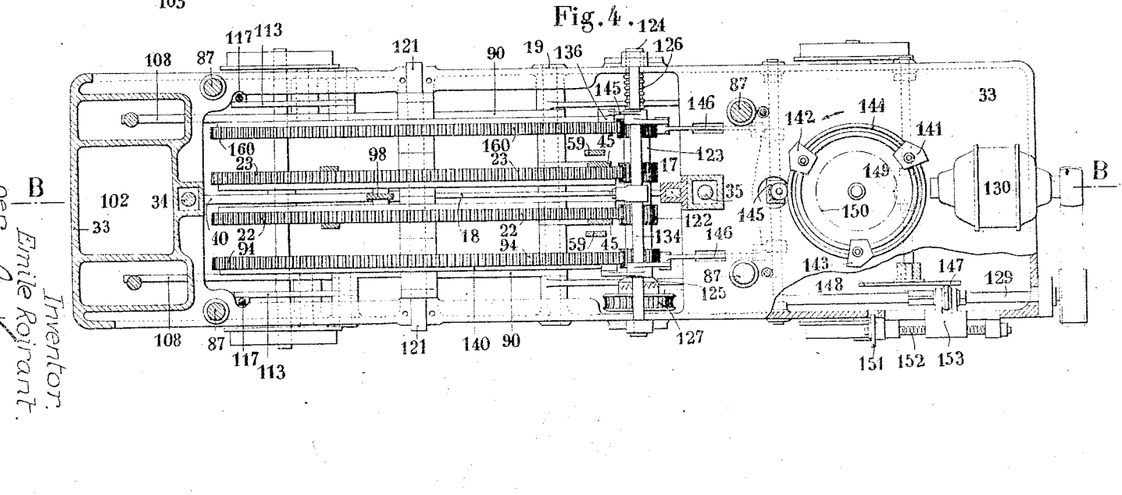
Fig. 4 is a horizontal section on the line C—C of Fig. 3.

This bar 96 receives a to and fro movement by means of a lever 98 which, in the example represented and for facility of construction, is hinged at 99 upon lever 40 and carries two rollers 100 engaged respectively in two grooves 101 formed upon the interior faces of the plates 22—23 (Figs. 3 and 4).

The blades 95 may thus penetrate into the interior of the furnace, slide under the bases of the parison moulds after they have been lifted and cut the glass which adheres to these latter.

After having effected this cutting, the blades 95 close the open base of the parison moulds and accompany these latter during their return movement as far as their withdrawal from the furnace.

Figure 10:
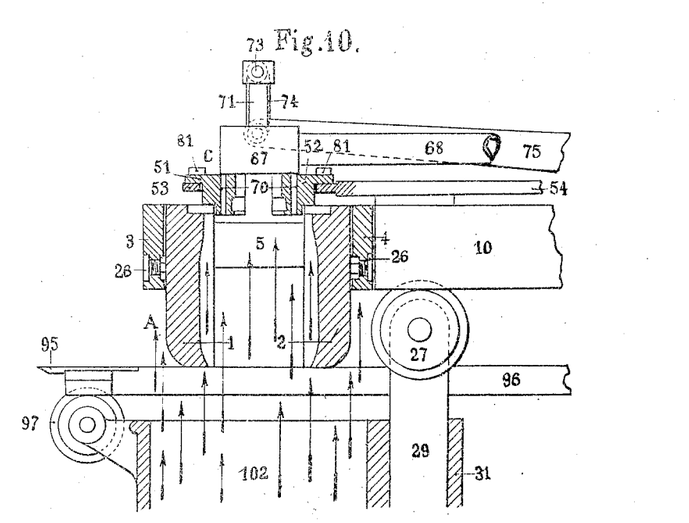
Fig. 10 represents this mould, the shells being open for the cooling.

At the end of this return travel, the parison moulds are, as seen in Figs. 3, 9 and 10, above a vertical conduit 102 having a large section, where the cooling air flows.

These parison moulds in their open positions Fig. 10, or closed Fig. 9, are therefore constantly enveloped by a blast of air during the whole time that they remain outside the furnace.

The two finishing moulds contained in the machine are arranged on each side of the parison moulds in the same horizontal plane and symmetrically with respect to the longitudinal axis of the machine, as seen in Figs. 2 and 7.

These two moulds operate simultaneously and each of them consists of two shells 103, fixed to the end of levers 104 hinged around axes 105 and connected, by links 106, to a vertical slide 107 which is controlled by a lever 108 turning at 109 and carrying a roller 110 engaged in a cam groove 111 formed for one of the moulds, upon the outer face of the plate 94 and for the other mould, upon the outer face of the plate 160.

Each slide 107 thus receives an alternate displacement and causes the closing and opening of each finishing mould.

A bottom 112 fixed immovably closes the base of each finishing mould in the closed position of these latter.

Figure 1:
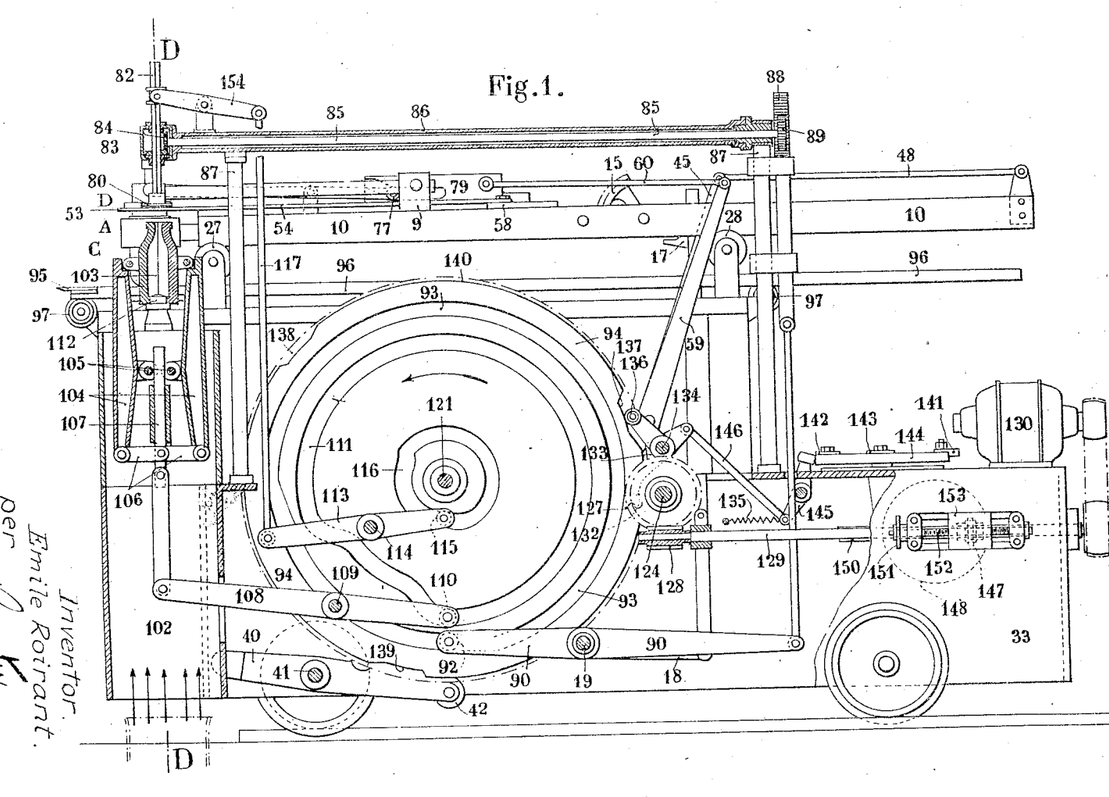
Fig. 1 is a vertical longitudinal section on the line A—A of Fig. 2.

The square hollow shaft 82, which controls the opening of the ring moulds, as above explained, receives in addition, an alternate vertical movement from a lever 113 which hinged at 114 in the frame, is provided with a roller 115 engaged in a cam groove 116 of the plate 94 and is connected by a rod 117 and a lever 154 to the shaft 82 (see Fig. 1).

This shaft 82 carries, at its base, a perforated piston 118 (see Fig. 13) suspended by a hollow rod 119 in which the compressed air can flow which is necessary for the blowing and arriving, by a flexible conduit arranged at the upper end of the said shaft 82. This compressed air is distributed by a valve not shown in the drawings.

Figure 13:
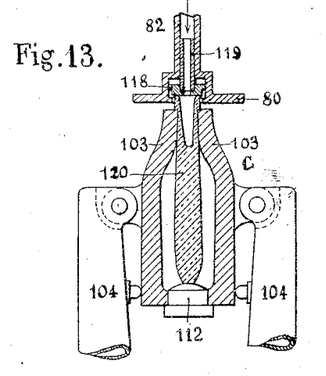
Fig. 13 is a vertical section representing the blowing.

When the open ring moulds have been displaced laterally away from the corresponding finishing moulds, and have thus handed to these latter the parison 120 which they were carrying the hollow shafts 82 receive a descending motion until the perforated pistons 118 rest upon the top of the parisons, which themselves rest by this ring upon the top of the closed finishing moulds, as seen in Fig. 13.

When this operation has been accomplished the air flows through the pistons 118 in order to blow the parisons to their final form.

When the bottle is finished and the finishing moulds have opened, this bottle rests upon the fixed finishing bottom 112 and the top of its ring is at a level above that of the lower part of the carrier for the ring moulds.

When these moulds carry a new parison from the parison moulds to the finishing moulds, the carrier for the ring moulds encounters the ring of the finished bottles and will throw these latter into a suitable conduit (not represented on the drawing) which will transport them outside the machine.

The different mechanical movements necessary for the displacements, the opening, the closing of the moulds, the cutting off, etc., are, as seen above, controlled by means of the disc cams 22, 23, 94 and 160.

These discs are mounted loosely upon a common shaft 121 around which they receive an intermittent rotary motion in such a manner that each revolution is divided into six periods during which the following operations are accomplished:

*1st period.*—Partial rotation of 120°, for example:
 (a) Closing of the parison moulds.
 (b) Advance movements of the carriage 10 to cause these moulds to penetrate into the interior of the furnace.
 (c) During this movement the lowering of the boring mandrels 72 into the interior of the ring moulds.
 (d) Descending movement of the front slide 29 in order to cause the lowering of the parison moulds into the glass in fusion.

*2nd period.*—Stoppage, the duration of which may be regulated, of the cam discs corresponding to the sucking up of the glass.

*3rd period.*—Partial rotation of 120°, for example:
 (a) Remounting of the front slide 29 in order to lift the parison moulds in the interior of the furnace above the level of the glass in fusion.
 (b) Cutting off.
 (c) Return of the carriage 10 to its initial position in order to bring the parison moulds to their starting point.
 (d) During this return, the raising of the boring mandrels 72 in order to permit the blowing in the parison moulds.

*4th period.*—Stoppage, the duration of which may be regulated, for the cooling of the glass contained in the parison moulds.

*5th period.*—End of the revolution of the discs 120° for example:
 (a) Simultaneous opening of the parison moulds and finishing moulds.
 (b) Displacement of the ring moulds with the parisons in order to bring these latter between the shells of the finishing moulds.
 (c) Closing of the finishing moulds.
 (d) Opening of the ring moulds in order to leave the parisons in the finishing moulds.
 (e) Return of the ring moulds to their starting position.
 (f) Lowering of the blowing heads.

*6th period.*—Stoppage, the duration of which may be regulated, for the cooling of the open parison moulds.

Figure 15:
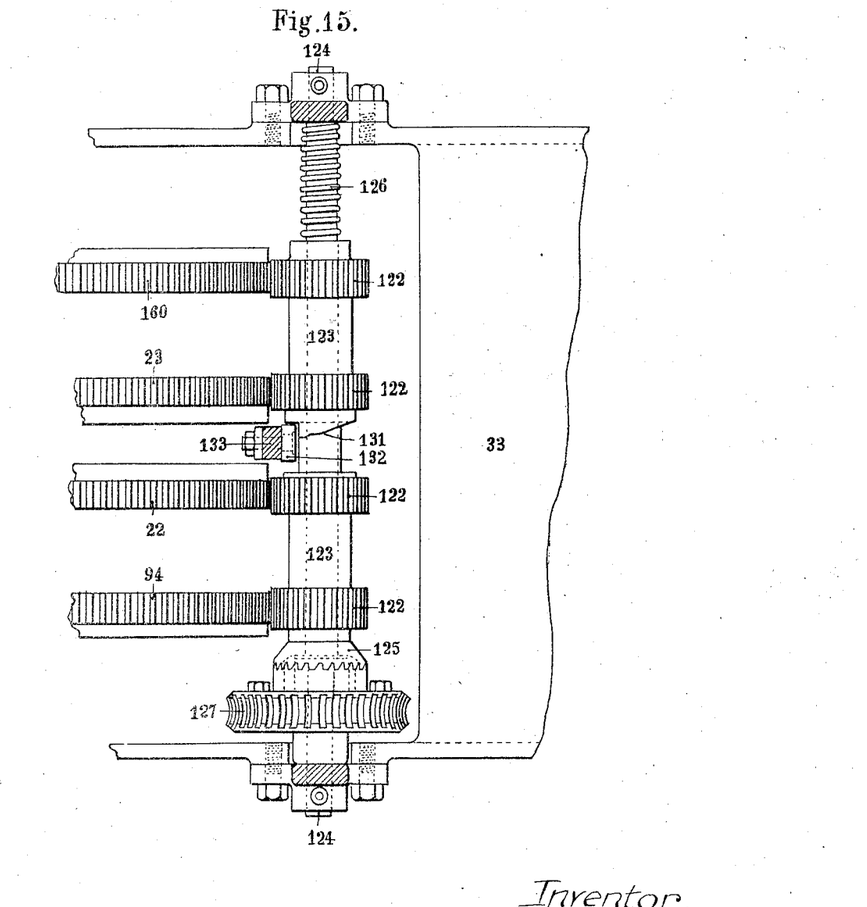
Fig. 15 represents in plan the arrangement for clutching and declutching the mechanism of the machine.

The disc cams mounted loosely upon the shaft 121, as it has been explained, are, in order to obtain the six periods above referred to, toothed at their exteriors as shown in Figs. 4 and 15, so that they may engage with the pinions 122 which are fixed to the same hub 123 which is mounted loosely and slides upon a shaft 124 rigidly fixed in the base of the machine.

The hub 123 carries at one of its ends one member 125 of a dog clutch and is submitted at its other end to the action of a spring 126 adapted to cause the clutching of the whole of the pinions 122 with a driving toothed wheel 127 in gear with an endless screw 128 fixed to a shaft 129 receiving a continuous rotary motion from an electric motor 130. The hub 123 carries also a cam 131 against which a roller 132, carried by a lever 133 keyed rigidly upon a shaft 134, may be brought periodically in order to cause the longitudinal displacement of the pinions 122 upon the shaft 124 against the action of the spring 126 and consequently the unclutching and stopping of these pinions and of the cam discs which thus receive angular rotary movements followed by stopping periods (Figs. 1, 3 and 15).

The roller 132 which is pulled back by the spring 135 towards the cam 131 can only, however, come into contact with this latter when a second roller 136 likewise carried by the shaft 134 penetrates into one of the three notches 137, 138 or 139 formed in the rolling surface 140 formed upon the periphery of the disc cams 94 and 160.

On the contrary, this unclutching roller 132 is disengaged from the cam 131 by means of projections 141, 142 and 143 which may be regulated in position and are carried by a plate 144, having a continuous rotary motion of variable speed, these projections causing the withdrawal of the roller 132 by means of levers 145 connected by rods 146 to the lever 133 carrying the unclutching roller 132 (see Figs. 1, 3 and 4).

The plate 144 carrying the three projections above referred to receives its rotary motion by means of a change speed apparatus comprising a friction roller 147 which is mounted in such a manner as to be capable of being drawn along by the controlling shaft 129 and of being displaced longitudinally upon this latter and is maintained in contact with a plate 148, the shaft of which carries an endless screw 149 in gear with a worm wheel 150 keyed upon the shaft of the plate 144 (Figs. 1, 3 and 4).

The longitudinal displacement of this roller 147 is obtained by means of a hand wheel 151 mounted on the end of a screw 152 engaged in a nut fixed with relation to a fork 153 between the arms of which is arranged the roller 147 which may thus be brought to a point more or less distant from the centre of the plate 148, and permits, consequently, the regulation of the speed of rotation of this plate and of that 144 carrying the projections.

It will be understood by that which precedes, that the intermittent movement of the cam discs for the realization of the six periods specified above is controlled on the one hand by the three stops 141, 142 and 143, the position of which may be regulated, and on the other hand by the notches 137, 138 and 139 formed upon the periphery of the cam disc 94, the stops controlling the clutching of these cam discs and the notches controlling the unclutching.

It will be understood in addition, that each revolution of the plate 144 corresponds to a revolution of the cam discs and, consequently, to the accomplishment of the six periods of manufacture of a bottle. Between two successive clutchings caused by two successive projections, there are produced two phases, namely:

1.—A mechanical phase of invariable duration, that is to say, rotation of the cam discs from one notch to the other.

2.—A stopping phase, of variable duration, depending upon the angular distance apart of two projections.

The working of the machine which, as it has been above stated, is divided into three kinematic phases and three stopping phases is as follows:

For greater clearance, the machine is supposed to be in operation and the first phase is taking place.

To arrive at the second phase which constitutes the suction, Fig. 8 (see description) the movement slide 10 moves toward the furnace in which it causes the closed parison moulds to enter.

At a certain moment, the movement stopping, the front vertical slide 29 lowers until the base of the parison moulds becomes level with the glass. At this exact instant the rollers 136, being lowered in the notches 137, and having permitted the roller 132 to enter into the cam 131, the cam discs stop.

The suction then takes place in the interior of the parison moulds which are filled with glass. In order to effect this operation, a certain time is necessary according to the weight of glass to be introduced into the mould, the composition of the glass and its temperature. This time, which will have been determined previously, is regulated by the distance between two of the projections placed upon the disc 144 receiving a continuous rotary motion. In effect, the stopping period will end as soon as one of the projections 142, for example, causes the reclutching of the cam discs.

It is evident that by causing the position of this projection to vary, the duration of the stopping period which is necessary for the suction will also vary.

The second phase being determinated by the action of this projection 142, movements will be produced which will constitute the third phase, and which will permit the starting of the fourth phase, Fig. 9. These movements are produced in the following order:

The vertical slide 29 is lifted, causing the lifting of the parison moulds and simultaneously the cutters 95 advance towards the interior of the furnace in order to operate the cutting off. Then simultaneously the parison moulds and the cutters leave the furnace and come back to their respective starting points, Fig. 9. There is then produced a new stopping of the cam discs caused, as it has been explained above, at the time of the preceeding stop and during which there is effected the fourth phase of the manufacture, that is to say, the cooling of the glass in the parison moulds.

It is necessary, in effect, in order that a parison may be blown under good conditions in the finishing mould, that this parison be brought to a determined temperature which will give to it the desired physical qualities.

It is equally evident that, notwithstanding the artificial cooling, a certain time is necessary in order to assure the cooling of the parison. Likewise, as for the suction, this time depends upon the composition and the temperature of the glass which is gathered, as well as the weight of the parison. It depends also upon the form of the parison.

In recapitulation, each element acts more or less during the whole period necessary for cooling, a period which must necessarily vary when the object to be manufactured is changed. Also, for the first phase, the projection 141 of the disc 144, which will cause the stoppage to cease, will have been placed in a position which is suitable in order to give to this stopping the desired period.

When this last stop has acted, a new clutching of the cam discs takes place which produces a series of movements which constitute the fifth phase and permits arrival at the sixth phase, that is to say, at the cooling of the parison moulds, Fig. 10; these movements are:

1.—Simultaneous opening of the parison and finishing moulds. At this moment the machine has the following aspect:

The parisons liberated from the parison moulds rest suspended from the ring moulds, the bottles which have been previously blown are liberated from the finishing moulds and rest upon the respective bottoms of the moulds.

2.—The ring moulds, carrying with them the parisons, are transported laterally and in opposite directions towards the respective finishing moulds.

In this movement, the blown bottles are thrown by the ring moulds and expelled from the machine.

3.—The finishing moulds close around the parisons suspended from the ring moulds.

4. The rotation of the cams 80 produces the opening of the ring moulds.

The parisons suspended from these ring moulds are liberated and the rings of these parisons repose upon the upper parts of the finishing moulds in the interior of which the parisons are then suspended, (Fig. 13).

5.—The ring moulds return to their first position, that is to say, into the centre of the parison moulds which have remained open.

6.—The square shafts 82 descend until the pistons 118 bear upon the upper parts of the rings of the parisons resting by their rings upon the finishing moulds, (Fig. 13).

5.—The blowing of the parisons takes place while the cam discs are stopped, in the manner already explained, so that the sixth phase of the operation is effected.

At this moment the machine presents the following aspect, Fig. 10; the parison moulds are open above the cooling conduit 102 and are enveloped interiorly and exteriorly with the blast of air which circulates from below upwards. These parison moulds have attained, due to the fact of their penetration into the furnace and due to the fact of contact with the glass which they contain, a relatively high temperature which requires to be considerably lowered in order that these moulds can penetrate afresh into the furnace and again suck up the charges of glass.

In order to lower this temperature, a certain time is required which depends upon the quantity of glass carried, the time during which this glass has rested in contact with the walls of the moulds, the mass of these moulds, etc. It is in reality upon this factor which depends above all the output of the machine, for the period of cooling of the parison moulds constitutes the longest of the six phases of manufacture. The duration of this time is reduced to the minimum, by means of the position given upon the disc 144 to the projection which causes afresh the clutching of the cam discs.

If the artifical cooling takes place in the best possible conditions, the time for cooling the parison moulds will be the minimum. For this reason the parison moulds remain open above, the cooling conduit 102 during the whole period of stoppage.

When the projection 143 of the disc 144, which limits this stoppage, acts afresh, the movements will recommence in order to repeat the phases which have just been described.

In consequence, after the reclutching of the cam discs, the following movements will be produced:

1.—Closing of the parison moulds causing the closing of the ring moulds.

2.—The slide of the moving part 10 moved towards the furnace.

3.—The parison moulds are lowered upon the surface of the glass.

4.—The discs are stopped and the second phase, suction, takes place; and so on as it has been above described.

Claims:—

1. In a machine for the manufacture of bottles and other similar objects, two parison moulds placed in front and drawing up their glass, by suction, in the interior of a furnace, the joint of the shells of these parison moulds being arranged perpendicularly to the direction of movement of penetration of the said moulds into the interior of the furnace, and the opening of these latter taking place in the direction of this movement of penetration.

2. In a machine for the manufacture of bottles and other similar objects, two simultaneously-operating parison moulds, two simultaneously-operating finishing moulds arranged respectively on each side of the parison moulds but not taking part in the movement of these latter, these finishing moulds being arranged in such a manner that the joints of their shells are parallel to those of the parison moulds.

3. In a machine for the manufacture of bottles and other similar objects, parison moulds, ring moulds following the movement of the parison moulds, means for spacing apart these ring moulds, when the parison moulds are brought back to their rear position in order to transport laterally the parisons from the parison moulds to the finishing moulds.

4. In a machine for the manufacture of bottles and similar objects, a parison mould formed of two shells, a support for the mould comprising two parts each adapted to support one of the said shells, a reciprocable slide pivotally secured to one of the parts of the support, and a second slide secured to the other part of the support and slidably mounted on said reciprocable slide.

5. In a machine for the manufacture of bottles and similar objects, a parison mould formed of two shells, and means for closing said mould comprising a support consisting of two parts each adapted to hold loosely one of the said shells, a reciprocable slide pivotally secured to one of the parts of the support, a second slide secured to the other part of the support and slidably mounted on said reciprocable slide, and a projection on each part of the support for exerting perpendicular to the closing plane of the mould an axial pressure at one point of each shell when the said slides are moved to close the shells of the mould.

6. In a machine for the manufacture of bottles and similar objects, a parison mould, a pair of supports for the mould, a slide on which each support is mounted, the slides being reciprocable in opposite directions, a carriage for said slides, and rollers supporting the carriage at the rear and front thereof, the rear rollers being fixed and capable of being regulated in position and the front rollers being movable vertically and capable of being regulated in position.

7. The structure recited in claim 6 together with a crank shaft connected to the said slides and means for communicating to the crank shaft an alternate angular movement.

8. The structure recited in claim 6 together with a crank shaft, and rods connecting the cranks of the crank shaft with the said slides, the cranks being set 180° apart and in such a manner that when the slides have been moved toward each other, the cranks and rods are in the same horizontal plane with the slides.

9. The structure recited in claim 6 together with a crank shaft, rods connecting the cranks of the crank shaft with the said slides, the cranks being set 180° apart and in such a manner that when the said slides have been moved toward each other the cranks and rods are in the same horizontal plane with the said slides, a toothed sector for actuating the crank shaft, a vertically reciprocable slide for actuating the sector, and a cam for reciprocating said last-mentioned slide.

10. In a machine for the manufacture of bottles and similar objects, a parison mould, a finishing mould, a carriage for said parison mould, a ring mould, a guide frame in which said ring mould is slidably mounted, a lever secured at one end to the said guide frame and pivotally connected to the carriage, a slide provided with a cam groove in which the other end of the lever is engaged and which is movable upon said carriage and adapted to reciprocate the ring mould between the parison mould and the finishing mould.

11. In a machine for the manufacture of bottles and similar objects, a parison mould, a finishing mould, a carriage for said parison mould, a ring mould, a mandrel for the ring mould, a lever pivotally mounted on the carriage and connected at one end to the mandrel, and a slide on said carriage provided with a cam groove in which is engaged the other end of said lever.

12. In a machine for the manufacture of bottles and similar objects, a parison mould, a ring mould, a mandrel for the ring mould, a finishing mould, and means for actuating said moulds and mandrel comprising a plurality of cam discs toothed at their peripheries, a common shaft on which said cam discs are loosely mounted, levers connecting said cam discs with said moulds and mandrel, pinions engaging the toothed peripheries of said cam discs, a longitudinally displaceable hub on which said pinions are fixed relative to each other, a continuously-rotatable pinion adapted to engage said first-mentioned pinions when the said hub is displaced longitudinally, and a spring for longitudinally displacing said hub.

13. The structure recited in claim 12 together with means for disengaging the first-mentioned pinions from the continuously-rotatable pinion comprising a cam carried by said first-mentioned pinions, a roller engaging the cam surface to move the cam and the said first-mentioned pinions longitudinally out of engagement with said second-mentioned pinion, a lever for moving said roller into and out of engagement with the said cam, and means for actuating said roller-moving lever comprising another cam, a roller actuated by said last-mentioned cam, and another lever connected to said last-mentioned roller and said roller-moving lever.

14. The structure recited in claim 12 together with a cam carried by said first-mentioned pinions, a roller engaging the cam surface to move the cam and first-mentioned pinions longitudinally out of engagement with said second-mentioned pinion against the action of the spring, a lever for moving said roller into and out of engagement with the said cam, and means for actuating said roller-moving lever automatically comprising another roller, a lever connected to said roller and said roller-moving lever, and a cam cooperating with said last-mentioned roller and provided with three notches so spaced apart on the cam surface as to produce, by engagement with the last-mentioned roller, the unclutching of the said pinions at the proper moments.

The foregoing specification of my "improved machine for manufacturing bottles and other hollow objects made of glass" signed by me this 28th day of June, 1926.

EMILE ROIRANT.